United States Patent
Goyal

(10) Patent No.: US 11,012,893 B2
(45) Date of Patent: May 18, 2021

(54) METHOD AND APPARATUS FOR MANAGING BEARER DURING X2 HANDOVER

(71) Applicant: Samsung Electronics Co., Ltd., Suwon-si (KR)

(72) Inventor: Nitin Goyal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 16/390,635

(22) Filed: Apr. 22, 2019

(65) Prior Publication Data

US 2019/0327646 A1 Oct. 24, 2019

(30) Foreign Application Priority Data

Apr. 23, 2018 (KR) .......................... 10-2018-0046880

(51) Int. Cl.
*H04W 36/00* (2009.01)
*H04W 36/08* (2009.01)

(52) U.S. Cl.
CPC .... *H04W 36/0011* (2013.01); *H04W 36/0079* (2018.08); *H04W 36/08* (2013.01)

(58) Field of Classification Search
CPC ............. H04W 36/0011; H04W 36/08; H04W 36/0079; H04W 36/0022; H04W 92/20
See application file for complete search history.

(56) References Cited

U.S. PATENT DOCUMENTS

| 10,349,317 | B2* | 7/2019 | Lee | H04W 36/0027 |
| 2012/0207129 | A1* | 8/2012 | Sun | H04W 76/00 370/331 |
| 2012/0225647 | A1* | 9/2012 | Nishida | H04W 76/18 455/423 |
| 2013/0163559 | A1* | 6/2013 | Wang | H04W 76/18 370/331 |
| 2014/0219248 | A1* | 8/2014 | Reddiboyana | H04W 76/15 370/331 |
| 2015/0215822 | A1 | 7/2015 | Won et al. | |

(Continued)

*Primary Examiner* — Christopher P Grey
(74) *Attorney, Agent, or Firm* — Jefferson IP Law, LLP

(57) ABSTRACT

The disclosure relates to a communication scheme and system for converging a 5$^{th}$ generation (5G) communication system for supporting a data rate higher than that of a 4$^{th}$ generation (4G) system with an internet of things (IoT) technology. The disclosure is applicable to intelligent services (e.g., smart home, smart building, smart city, smart car or connected car, health care, digital education, retail, and security and safety-related services) based on the 5G communication technology and the IoT-related technology. A mobility management entity (MME) and a bearer management method of the MME during an X2 handover in a wireless communication system are provided. The method includes receiving, from a source base station, a response message related to a radio access bearer (RAB) of a network and including information indicating whether the X2 handover is triggered, starting a timer based on the response message, and resuming, based on an expiration of the timer, a procedure for managing the RAB of the network with a target base station.

14 Claims, 12 Drawing Sheets

(56) References Cited

U.S. PATENT DOCUMENTS

2017/0164238 A1* 6/2017 Paredes Cabrera ..... H04L 69/22
2017/0230935 A1* 8/2017 Xu ........................ H04W 68/02
2019/0357295 A1* 11/2019 Kim ..................... H04L 5/0053

* cited by examiner

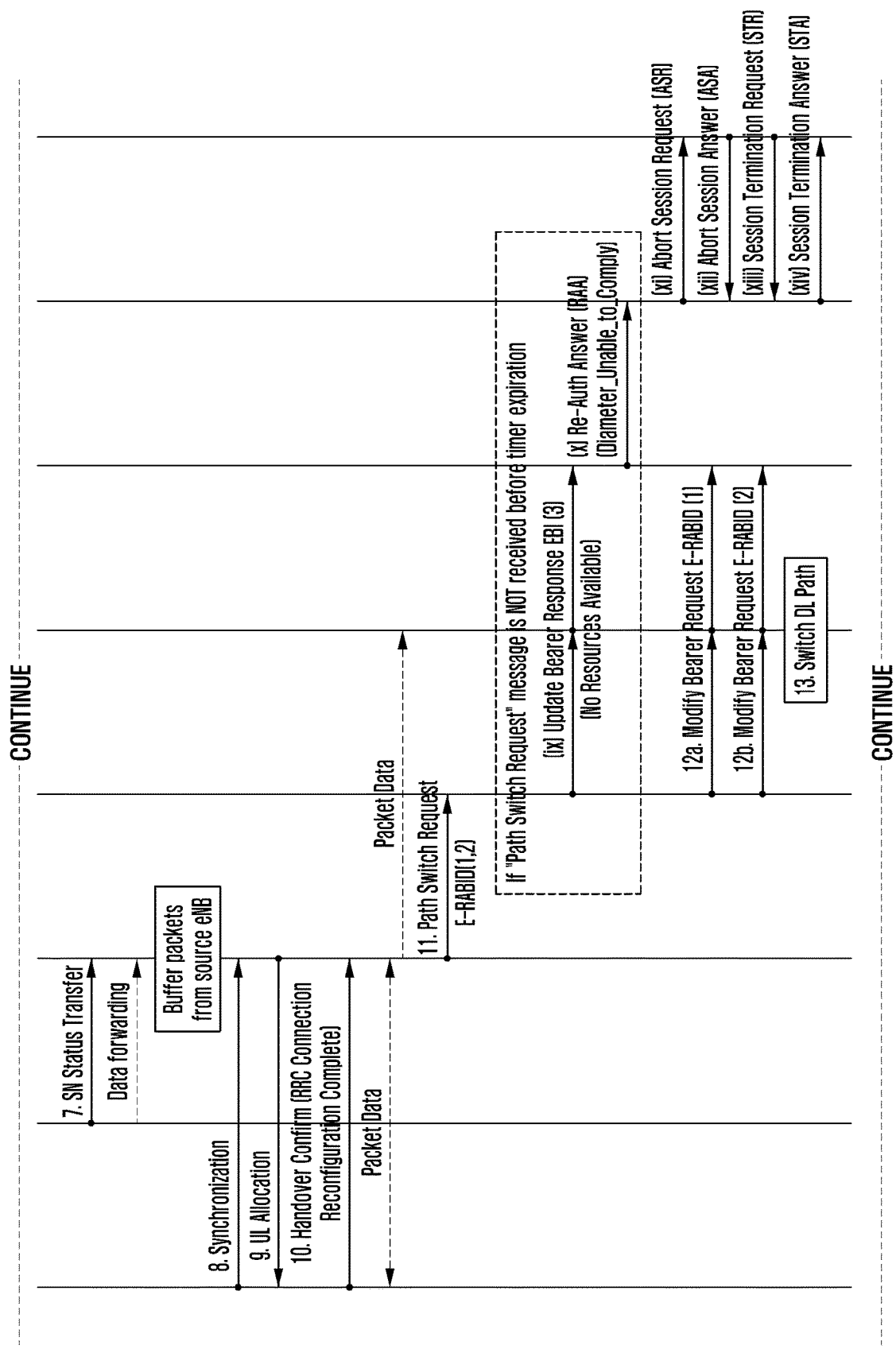

METHOD AND APPARATUS FOR MANAGING BEARER DURING X2 HANDOVER

CROSS-REFERENCE TO RELATED APPLICATION(S)

This application is based on and claims priority under 35 U.S.C. 119(a) of a Korean patent application number 10-2018-0046880, filed on Apr. 23, 2018, in the Korean Intellectual Property Office, the disclosure of which is incorporated by reference herein in its entirety.

BACKGROUND

1. Field

The disclosure relates to technology for controlling voice over long term evolution (VoLTE) call setup signaling during X2 handover signaling in a wireless communication system.

2. Description of Related Art

To meet the increased demand for wireless data traffic since the deployment of 4th generation (4G) communication systems, efforts have been made to develop an improved 5th generation (5G) or pre-5G communication system. Therefore, the 5G or pre-5G communication system is also called a "beyond 4G network" or a "post LTE system." Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), full dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, hybrid frequency-shift keying (FSK) and quadrature amplitude modulation (QAM) (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of things (IoT) where distributed entities, such as things, exchange and process information without human intervention. The Internet of everything (IoE), which is a combination of IoT technology and Big Data processing technology through connection with a cloud server, has emerged. As technology elements, such as "sensing technology," "wired/wireless communication and network infrastructure," "service interface technology," and "security technology" have been demanded for IoT implementation, recently there has been research into a sensor network, machine-to-machine (M2M) communication, machine type communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing information technology (IT) and various industrial applications.

In line with these developments, various attempts have been made to apply the 5G communication system to IoT networks. For example, technologies such as a sensor network, MTC, and M2M communication may be implemented by beamforming, MIMO, and array antennas. Application of a cloud RAN as the above-described big data processing technology may also be considered to be an example of convergence between the 5G technology and the IoT technology.

Meanwhile, if an X2 handover is triggered before a bearer management is completed, bearer establishment/modification cannot be completed successfully, resulting in VoLTE call setup failure. Here, frequent X2 handover attempts before completion of the bearer management increases VoLTE call setup failure rate, which brings about degradation of network key performance indicators (KPI).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for establishing or modifying a voice over long term evolution (VoLTE) bearer during an X2 handover.

Additional aspects will be set forth in part in the description which follows and, in part, will be apparent from the description, or may be learned by practice of the presented embodiments.

In accordance with an aspect of the disclosure, a bearer management method of a mobility management entity (MME) during an X2 handover in a wireless communication system is provided. The method includes receiving, from a source base station, a response message related to a radio access bearer (RAB) of a network, starting a timer based on the response message including information indicating that the X2 handover is triggered, and resuming, based on a timing expiry of the timer, a procedure for managing the RAB of the network with a target base station.

In an implementation, the response message is an evolved universal terrestrial access network (E-UTRAN) RAB (E-RAB) setup response message corresponding to an E-RAB setup request message or an E-RAB modify response message corresponding to an E-RAB modify request message.

In an implementation, the method further includes determining whether a path switch request message is received from the target base station.

In an implementation, the resuming of the procedure includes transmitting, to the target base station, a message requesting for establishing or modifying the E-RAB (E-RAB setup-modify request) based on receiving the path switch request message from the target base station before the timing expiry.

In an implementation, the method further includes transmitting a successful bearer management response message (successful create/update bearer response) to a serving gateway (S-GW).

In an implementation, the resuming of the procedure includes transmitting an unsuccessful bearer management response message (unsuccessful create/update bearer response) including information indicating no available resources (no resources available) to an S-GW based on not receiving the path switch request message from the target base station before the timing expiry.

In an implementation, the method further includes receiving a bearer management request message (create/update bearer request) from an S-GW.

In an implementation, the method further includes transmitting an unsuccessful bearer response message (unsuccessful create/update bearer response) including information indicating no available resources (no resources available) to an S-GW based on the response message not including the information indicating that the X2 handover is triggered.

In accordance with another aspect of the disclosure, an MME performing bearer management during an X2 handover in a wireless communication system is provided. The MME includes a transceiver and a controller. The controller is configured to control the transceiver to receive, from a source base station, a response message related to an RAB of a network, start a timer based on the response message including information indicating that the X2 handover is triggered, and resume, based on a timing expiry of the timer, a procedure for managing the RAB of the network with a target base station.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 5A, 5B, and 5C are a signal flow diagram illustrating a method for modifying a VoLTE bearer during an X2 handover according to various embodiments of the disclosure;

Throughout the drawings, like reference numerals will be understood to refer to like parts, components, and structures.

DETAILED DESCRIPTION

Figure 1:
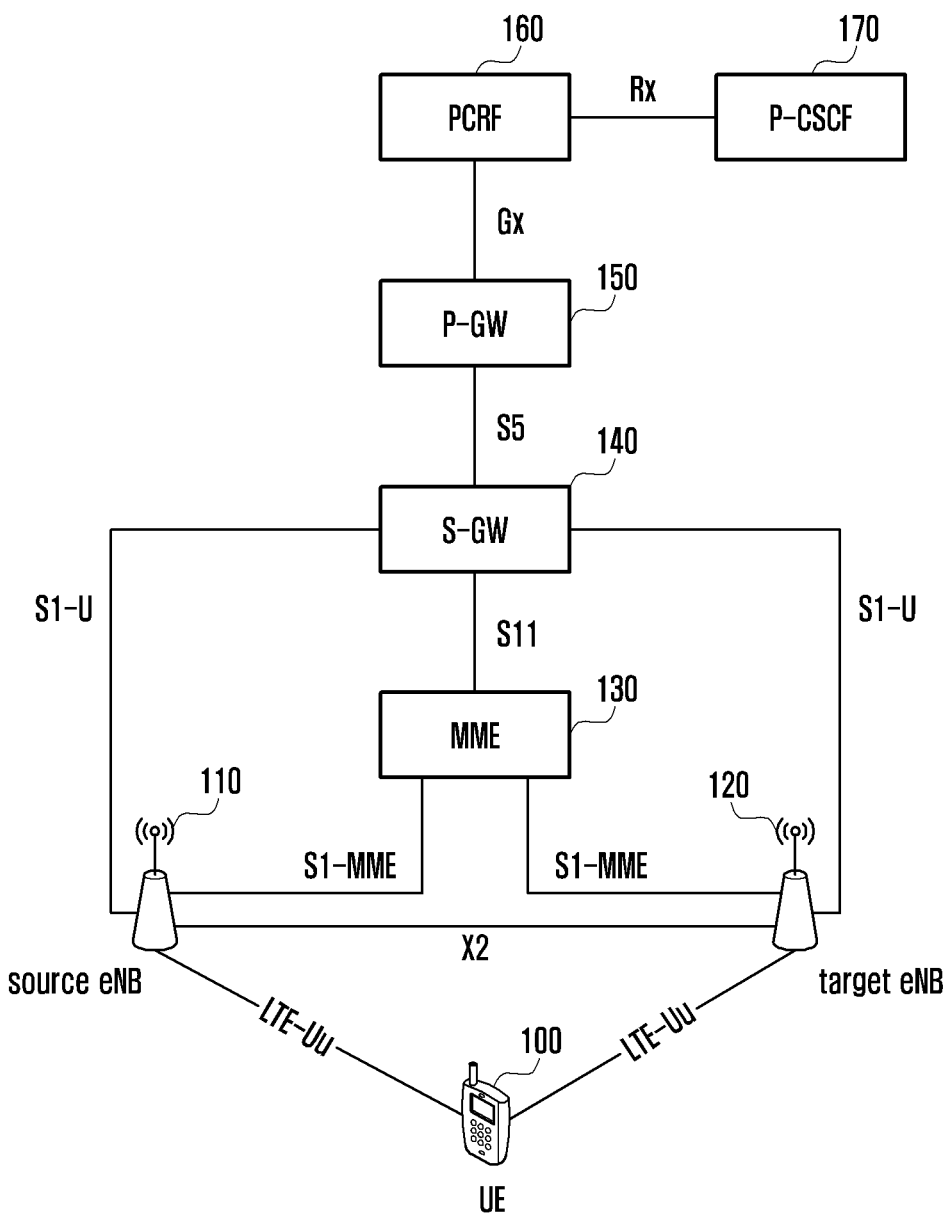
FIG. 1 is a diagram illustrating architecture of a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood by those skilled in the art that the disclosure can be applied even to other communication systems having a similar technical background and channel format, with a slight modification, without departing from the spirit and scope of the disclosure.

Detailed descriptions of technical specifications well-known in the art and unrelated directly to the disclosure may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed descriptions of various embodiments and the accompanying drawings. The disclosure may, however, be embodied in many different forms and should not be construed as being limited to the various embodiments set forth herein; rather, these various embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module," means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more central processing units (CPUs) in a device or a secure multimedia card.

FIG. 1 is a diagram illustrating architecture of a wireless communication system according to an embodiment of the disclosure.

FIG. 1 shows network architecture including network entities related to a voice over long term evolution (VoLTE) call and an X2 handover. The network architecture of FIG. 1 is identical with the third generation partnership project (3GPP) standard architecture for LTE and international mobile telecommunications (IMT) network and depicts standard interfaces between the network entities.

Referring to FIG. 1, the wireless communication system includes a terminal 100, a source base station 110, a target base station 120, a mobility management entity (MME) 130, a serving gateway (S-GW) 140, a packet data network gateway (P-GW) 150, a policy and charging rules function (PCRF) 160, a proxy call session control function (P-CSCF) 170, and interfaces defined between the entities (LTE-Uu, S1-MME, S1-U, S11, S5, Gx, and Rx).

Referring FIG. 1, the terminal 100 may be served by one of the base stations 110 and 120 according to variation in its location as the terminal 100 moves. The terminal 100 being served by the source base station 110 may be handed over to the target base station 120 to maintain service continuity.

The terminal 100 communicates user data or control data with the base stations 110 and 120 via radio interfaces. Here, examples of the base stations include an evolved node B (eNB), a node B (NB) or a radio network subsystem (RNS) including the NB, a base transceiver station (BTS) or a base station subsystem (BBS) including the BTS, and a wireless access point.

Typically, the base stations 110 and 120 each host one or more cells having a predetermined coverage, and the terminal 100 is served by one of the base stations 110 and 120 according to whether it is located within a cell of the source base station 110 or the target base station 120. Here, the cell means a cell of a cellular system, and the base stations 110 and 120 are devices that each manage and control their own cells.

The MME 130 is responsible for mobility and session management and authentication and security control for the terminal 100 (also referred to herein as a user equipment (UE)), and the S-GW 140 acts as an anchor point for user data traffic of the terminal 100.

The P-GW 150 relays user data (uplink or downlink data) of the terminal 100, and the PCRF 160 is involved in policy and charging determination and interoperates with a policy/charging execution function of the P-GW 150 in order for the P-GW 150 to execute an actual policy and charging determination.

The P-CSCF 170 is a starting point through which the terminal accesses an internet protocol (IP) multimedia subsystem (IMS). The P-CSCF 170 is provided with a quality of service (QoS) control-related function and performs bearer resource authentication and QoS management through interoperation with a policy decision function (PDF) or policy control function (PCF) that controls a QoS policy.

Meanwhile, there is a need of a method for managing a session of the terminal during a handover procedure in a wireless communication system. The handover procedure may include an S1 handover in which a handover required message is transmitted from the source base station (eNB) 110 to the MME (or a control entity) and an X2 handover in which a handover request message is transmitted from the source base station (eNB) to the target base station (eNB) 120.

In particular, the disclosure provides an improved bearer management method that is capable of facilitating a handover request message transmission between the base station during the X2 handover.

The embodiments of the disclosure are applicable to both a UE that places a call and a UE that receives a call.

Figure 2A:
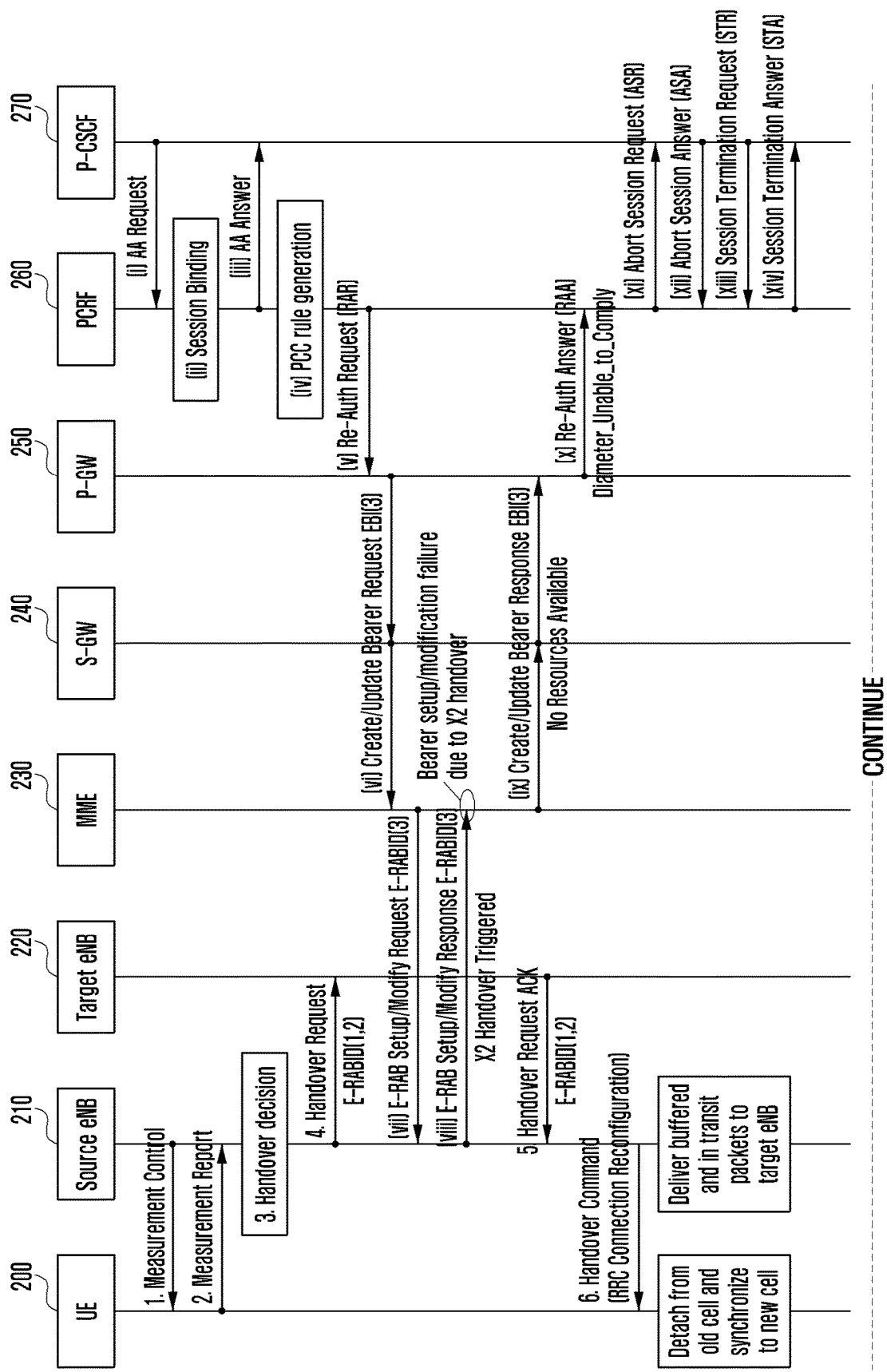
FIGS. 2A and 2B are a signal flow diagram illustrating a situation where a voice over long term evolution (VoLTE) call setup fails during an X2 handover according to various embodiments of the disclosure.
Figure 2B:
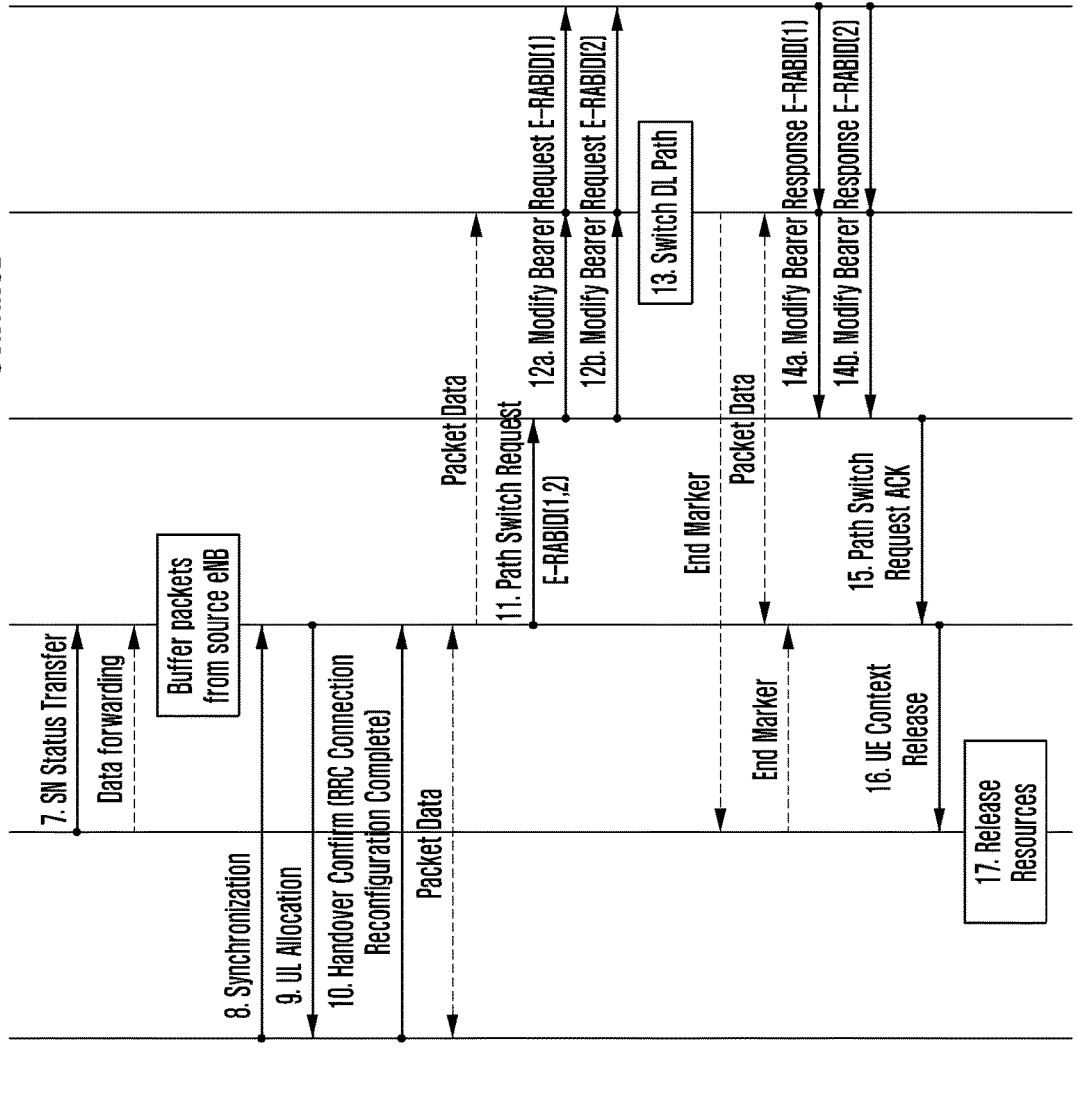

FIGS. 2A and 2B are a signal flow diagram illustrating a situation where a VoLTE call setup fails during an X2 handover according to various embodiments of the disclosure.

Referring to FIGS. 2A and 2B, it may occur that VoLTE call setup signaling (operations i~xiv) is triggered during X2 handover signaling (operations 1~17).

Referring to FIG. 2A, a UE 200 may receive a measurement control message from a source eNB 210 at operation 1 and transmit a measurement report to the source eNB 210 at operation 2, the measurement report being generated based on the measurement control message. The source eNB 210 may make a handover decision at operation 3 for the UE 200 based on the measurement report and transmit a handover request message including an E-RAB identifier (ID) (1,2) to a target eNB 220 at operation 4.

Meanwhile, a P-CSCF 270 transmits an authentication/authorization (AA) request message corresponding to an incoming call to a PCRF 260 at operation i, and the PCRF 260 performs session binding at operation ii upon receipt of the AA request message. The PCRF 260 transmits an AA answer message to the P-CSCF 270 at operation iii, and generates a policy and charging control (PCC) rule at operation iv. The PCRF 260 transmits a re-auth request (RAR) message to a P-GW 250 at operation v, and the P-GW 250 transmits, at operation vi, a Create/Update Bearer Request message including an evolved packet system (EPS) bearer ID (EBI) (3) to an MME 230 via an S-GW 240.

The MME 230 transmits an E-RAB Setup/Modify Request message including the EBI (3) to the source eNB 210 at operation vii, and the source eNB 210 transmits, at operation viii, to the MME 230 an E-RAB Setup/Modified Response message including the EBI (3) and "X2 Handover Triggered" indicating that an X2 handover is triggered. In this case, the X2 handover may incur a bearer setup/modification failure.

At operation ix, the MME 230 transmits to the P-GW 250 a Create/Update Bearer Response message including the EBI (3) along with "No Resources Available" indicating that there are no available resources. At operation x, the P-GW 250 transmits the PCRF 260 a re-auth answer (RAA) message along with "Diameter_Unable_to_comply."

The PCRF 260 transmits to the P-CSCF 270 an abort session request (ASR) message at operation xi to request session termination, and the P-CSCF 270 transmits to the PCRF 260 an abort session answer (ASA) message at operation xii.

The P-CSCF 270 transmits a session termination request (STR) message to the PCRF 260, at operation xiii, to request session termination, and the PCRF 260 transmits a session termination answer (STA) message to the P-CSCF 270, at operation xiv, to terminate the session.

If an X2 handover is triggered before bearer management, it is impossible to establish/modify a bearer successfully as specified in section 8.2.1 and 8.2.2 of 3GPP TS 36.413 and incur VoLTE call setup termination as shown in FIG. 2A. In this case, the X2 handover is attempted frequently in the network, and the VoLTE call setup failure rate increases, resulting in degradation of network KPI.

Figure 4A:
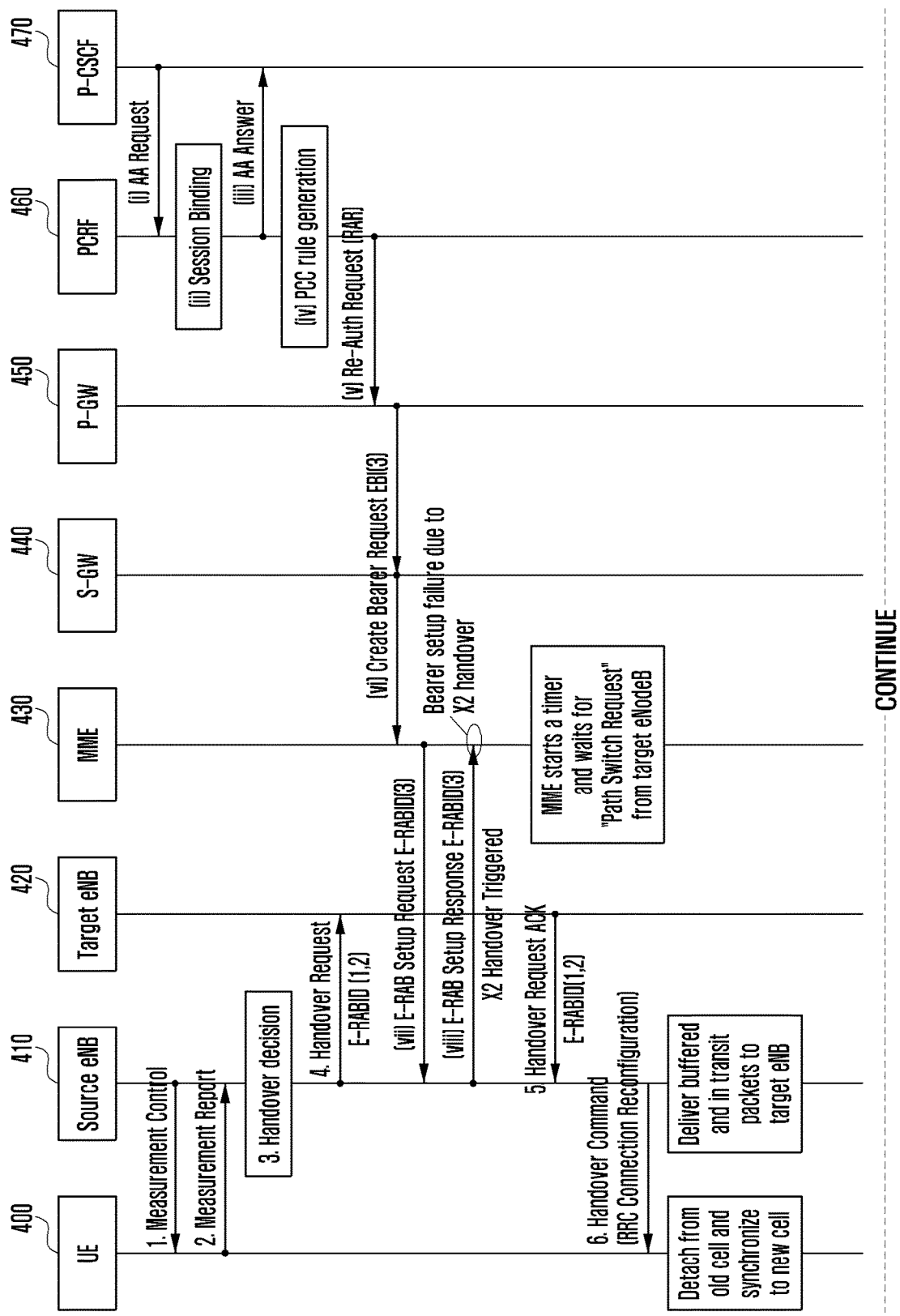
FIGS. 4A, 4B, and 4C are a signal flow diagram illustrating a method for establishing a VoLTE bearer during an X2 handover according to various embodiments of the disclosure.
Figure 4B:
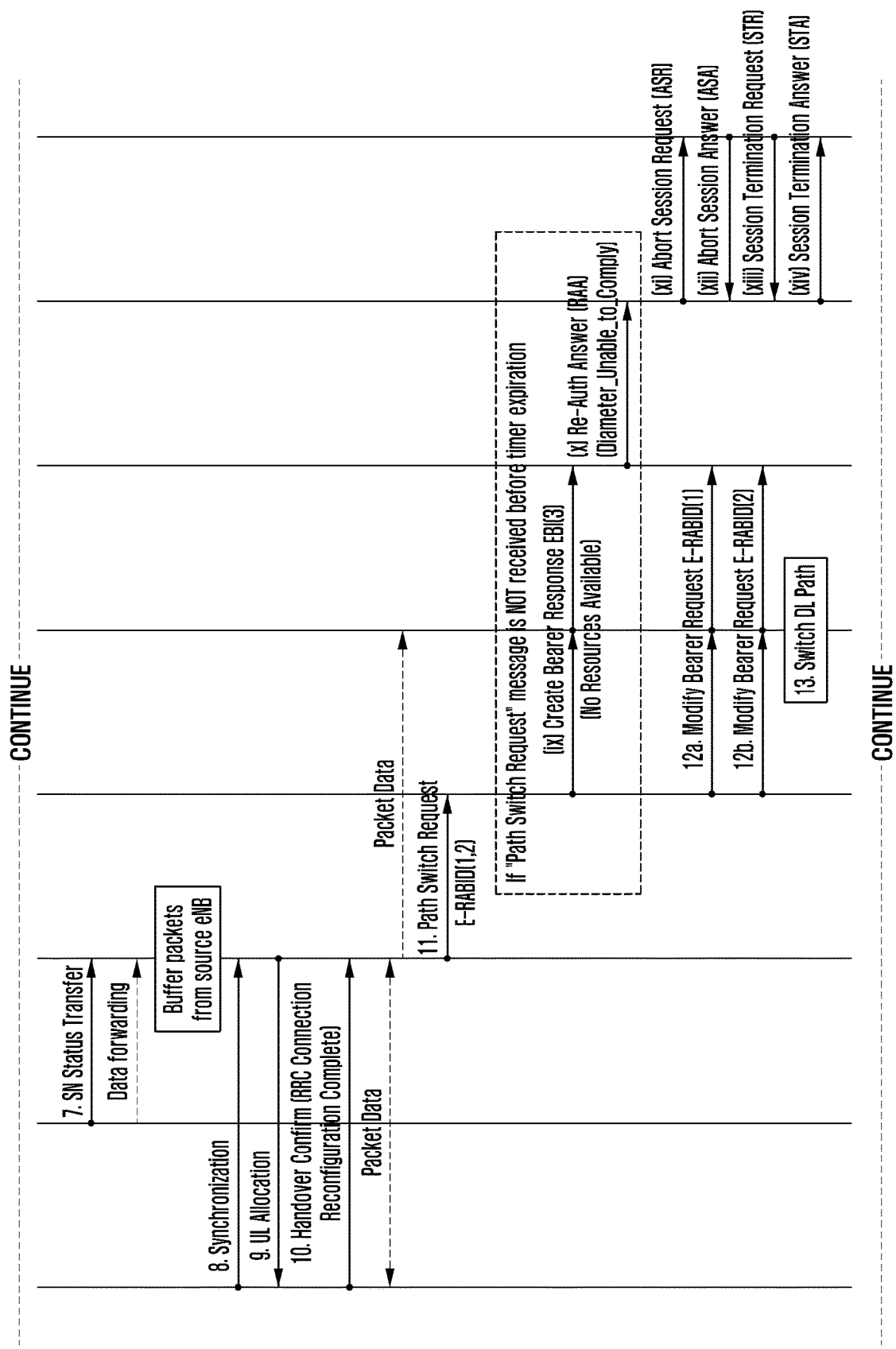
Figure 4C:
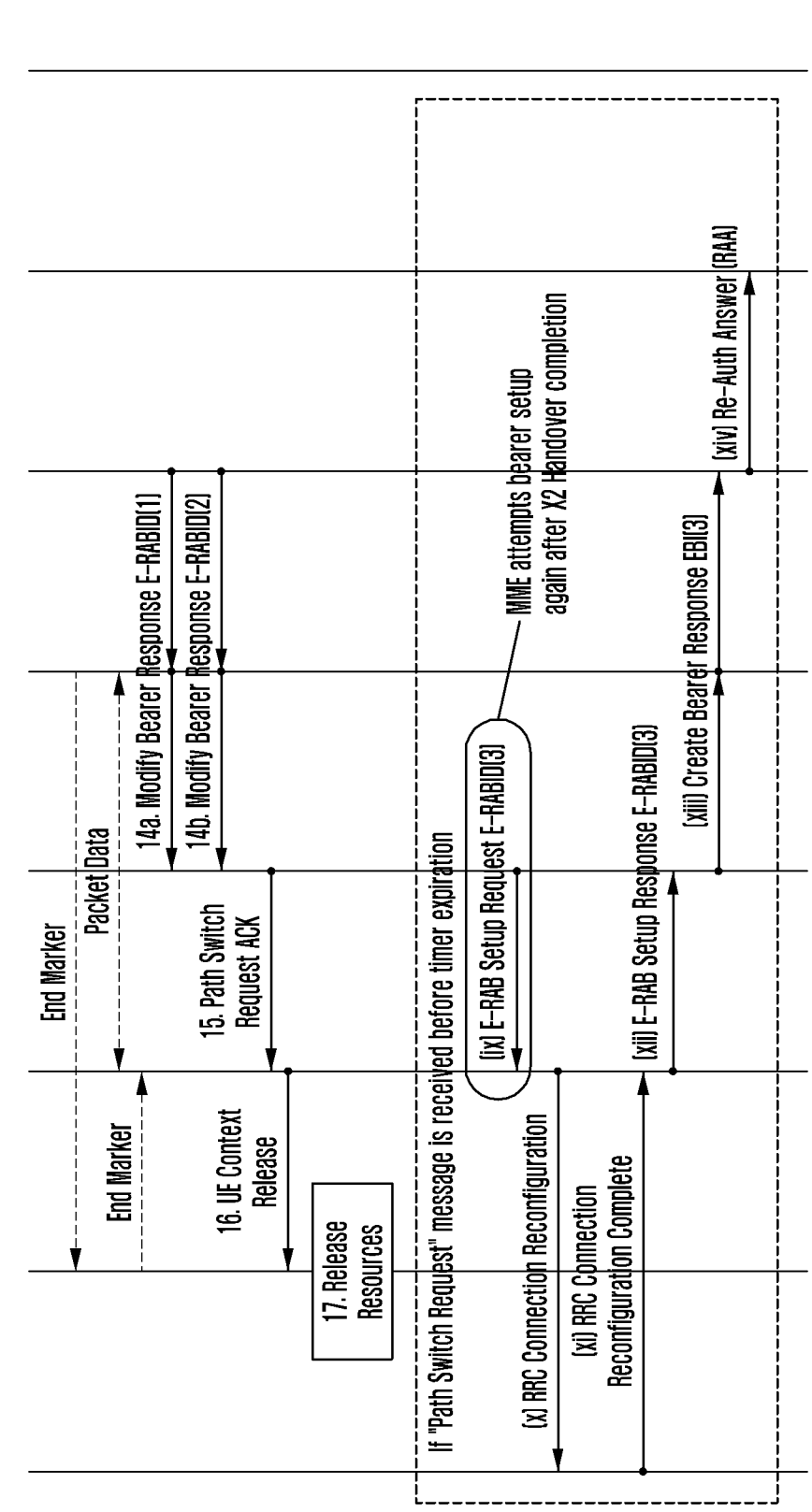
Figure 5A:
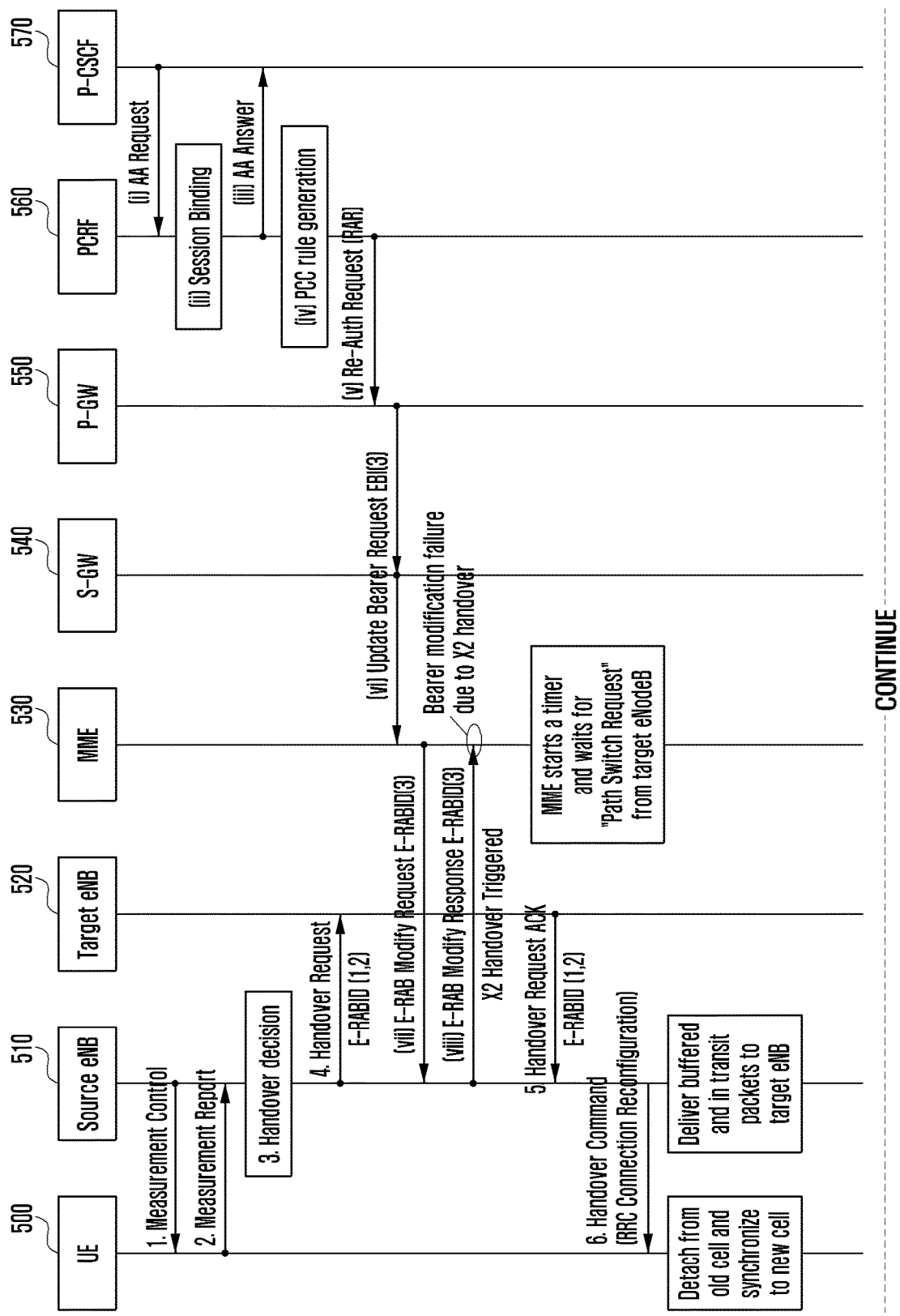
Figure 5C:
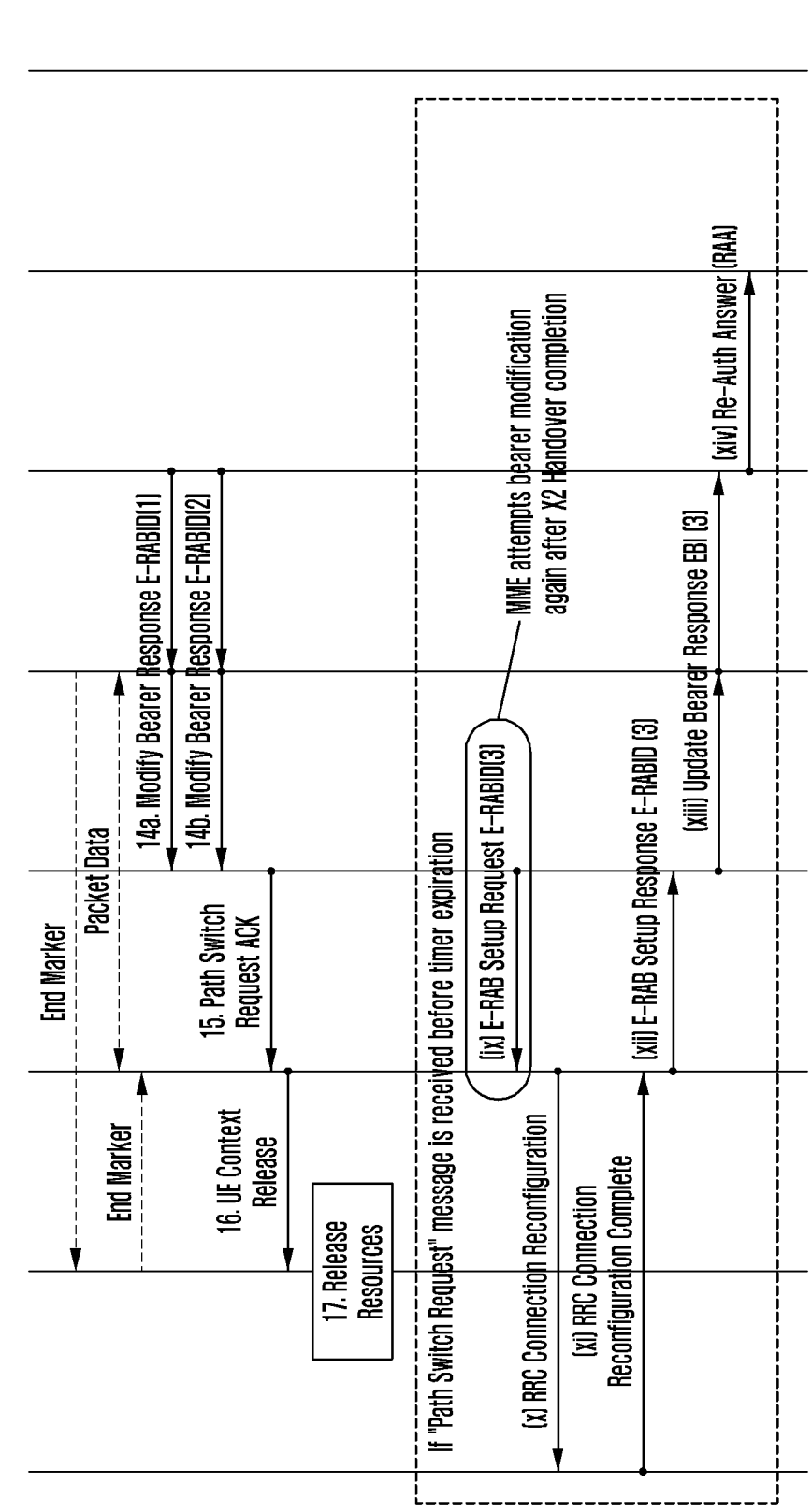

In order to solve the above problem, the disclosure proposes a method for establishing a VoLTE bearer during an X2 handover as shown in FIGS. 4A to 4C and a method for modifying a VoLTE bearer during an X2 handover as shown in FIGS. 5A to 5C.

The target eNB 220 transmits, at operation 5, a handover request acknowledgment (ACK) message including E-RAB (1,2) to the source eNB 210 in response to the handover request message received at operation 4. At operation 6, the source eNB 210 transmits a handover command message to the UE 200 via a radio resource control (RRC) connection reconfiguration message. Upon receipt of the handover command message, the UE 200 may detach from the old cell and acquire synchronization with a new cell. The source eNB 210 transmits buffered and in-transit packets to the target eNB 220.

Referring to FIG. 2B, the source eNB 210 transmits a sequence number (SN) status transfer message to the target eNB 220 at operation 7 and forwards data to the target eNB. The target eNB 220 may buffer the packets transmitted by the source eNB 210.

The UE 200 transmits a synchronization-related message to the target eNB 220 at operation 8, and the target eNB 220 transmits an uplink (UL) allocation-related message to the UE 200 at operation 9.

The UE 200 transmits a handover confirm message to the target eNB 220 via an RRC connection reconfiguration complete message at operation 10 and may communicate packet data with the target eNB 220. The target eNB 220 may transmit the packet data to the S-GW 240.

At operation 11, the target eNB 220 transmits a path switch request message associated with E-RAB (1,2) to the MME 230 to request path switching. The MME 230 transmits, at operation 12a, a modify bearer request message associated with E-RAB (1) to the P-GW 250 to request bearer modification and, at operation 12b, a modify bearer request message associated with E-RAB (2) to the P-GW 250 to request bearer modification.

At operation 13, the S-GW 240 may perform downlink (DL) path switching. The S-GW 240 transmits an end marker to the source eNB 210, the source eNB 210 transmits an end marker to the target eNB 220, and the target eNB 220 may communicate packet data with the S-GW 240.

The P-GW 250 transmits, at operation 14a, a modify bearer response message to the MME 230 via the S-GW 240 in response to the modify bearer request message associated with E-RAB (1) and transmits, at operation 14b, a modify bearer response message to the MME 230 in response to the modify bearer request message associated with the E-RAB (2). The MME 230 transmits a path switch request ACK message to the target eNB 220 at operation 15, and the target eNB 220 transmits a UE context release message to the eNB 210 at operation 16. At operation 17, the source eNB 210 may release resources upon receipt of the UE context release message.

Figure 3:
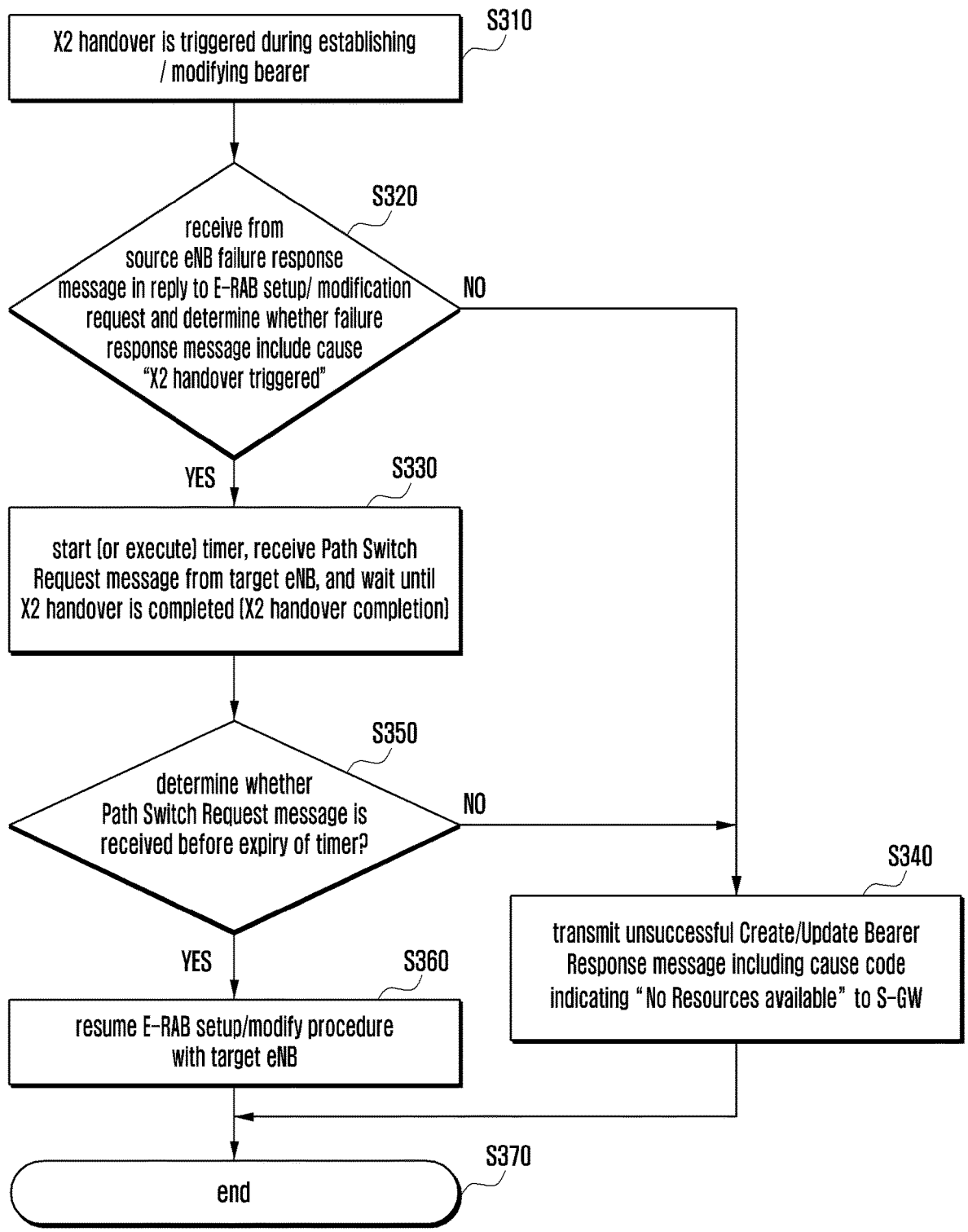
FIG. 3 is a flowchart illustrating an operation method of an MME according to an embodiment of the disclosure.

FIG. 3 is a flowchart illustrating an operation method of an MME according to an embodiment of the disclosure.

FIG. 3 shows an operation method of an MME for solving the problem described with reference to FIGS. 2A and 2B, and operations of the entities constituting the wireless communication system are described with reference to FIGS. 4 and 5.

The present disclosure provides a method for reducing a VoLTE call setup failure rate in a VoLTE network in such a way that the MME manages a bearer establishment/modification process efficiently in a situation where an X2 handover is triggered during a VoLTE call setup for a terminal (or UE) on the move.

Although the MME receives a failure response (e.g., an E-RAB setup/modify response at operation viii in FIG. 2A) from the source eNB during the X2 handover, it does not transmit the failure response (e.g., a create/update bearer response at operation ix in FIGS. 2A and 2B) to the S-GW immediately for bearer creation/modification.

Upon receipt of the failure response from the source eNB, the MME starts a timer and waits for a path switch request message from a target eNB. The path switch request message is transmitted from the target eNB to the MME during an X2 handover procedure to notify the MME that the cell serving the UE is changed and indicate the necessity for the S-GW to forward incoming packets to another destination.

If a path switch request message is received from the target eNB before expiry of the timer, the MME performs the E-RAB setup/modification procedure again with the target eNB to establish/modify a bearer with the target eNB successfully.

If no path switch request message is received from the target eNB before expiry of the timer, the MME transmits a failure message to the S-GW to establish/modify a bearer.

Referring to FIG. 3, an X2 handover may be triggered at operation S310 during a bearer setup/modification procedure.

At operation S320, the MME receives a failure response message from the source eNB in reply to an E-RAB setup/modification request and determines whether the failure response message includes a cause "X2 handover triggered." The response message may be an E-RAB setup response message in reply to the E-RAB setup request message or an E-RAB modify response message in reply to the E-RAB modify request message.

If it is determined that the failure response message includes the cause "X2 handover triggered," the MME, at operation S330, starts (or executes) a timer, receives a path switch request message from the target eNB, and waits for an X2 handover completion message.

If it is determined that the failure response message does not include the cause "X2 handover triggered," the MME transmits an unsuccessful create/update bearer response message to the S-GW at operation S340. In this case, the unsuccessful create/update bearer response message includes a cause code indicating "No Resources available." If the response message does not include information indicating that an X2 handover is triggered (X2 handover triggered), the MME may transmit to the S-GW an unsuccessful create/update bearer response message including information indicating that there are no available resources (no resources available).

The MME may determine at operation S350 where a path switch request message is received before expiry of the timer executed at operation S330.

If it is determined that the path switch request message is received before expiry of the timer, the MME performs the E-RAB setup/modify procedure again with the target eNB at operation S360. If the path switch request message is received from the target eNB before expiry of the timer, the MME may transmit to the target eNB a message to request setup or modification of a RAB (E-RAB) (E-RAB setup/modify request).

If it is determined that the path switch request message is not received before expiry of the timer, the MME transmits an unsuccessful create/update bearer response message to the S-GW at operation S340. The unsuccessful create/update bearer response message includes a cause code indicating "No resources available." If no path switch request message is received from the target eNB before expiry of the timer, the MME transmits to the S-GW an unsuccessful create/update bearer response message including information indicating that there are no available resources (no resource available).

FIGS. 4A, 4B, and 4C are a signal flow diagram illustrating a method for establishing a VoLTE bearer during an X2 handover according to various embodiments of the disclosure.

FIGS. 4A to 4C show a procedure for establishing a VoLTE bearer during an X2 handover according to various embodiments of the disclosure.

Referring to FIGS. 4A to 4C, it may occur that VoLTE call setup signaling (operations i~xiv) is triggered during X2 handover signaling (operations 1~17).

Referring to FIG. 4A, a UE 400 may receive a measurement control message from a source eNB 410 at operation 1 and transmit a measurement report to the source eNB 410 at operation 2, the measurement report being generated based on the measurement control message. The source eNB 410 may make a handover decision at operation 3 for the UE 400 based on the measurement report and transmit a handover request message including an E-RAB ID (1,2) to a target eNB 220 at operation 4.

Meanwhile, a P-CSCF 470 transmits an AA request message corresponding to an incoming call to a PCRF 460 at operation i, and the PCRF 460 performs session binding at operation ii upon receipt of the AA request message. The PCRF 460 transmits an AA answer message to the P-CSCF 470 at operation iii and generates a PCC rule at operation iv. The PCRF 460 transmits a RAR message to a P-GW 450 at operation v, and the P-GW 450 transmits, at operation vi, a create/update bearer request message including an EBI (3) to an MME 430 via an S-GW 440.

The MME 430 transmits an E-RAB setup/modify request message including the EBI (3) to the source eNB 410 at operation vii, and the source eNB 410 transmits, at operation viii, to the MME 430 an E-RAB setup/modified response message including the EBI (3) and "X2 Handover Triggered" indicating that an X2 handover is triggered. In this case, the X2 handover may incur a bearer setup/modification failure.

If the MME 430 receives the E-RAB Setup Response message including "X2 Handover Triggered," it starts (or executes) a timer and waits until a path switch request message is received from the target eNB 420.

The target eNB 420 transmits, at operation 5, a handover request ACK message associated with E-RAB (1,2) to the source eNB 410 in response to the handover request message received at operation 4. At operation 6, the source eNB 410 transmits a handover command message to the UE 400 via an RRC connection reconfiguration message. Upon receipt of the handover command message, the UE 400 may detach from the old cell and acquire synchronization with a new cell. The source eNB 410 transmits buffered and in-transit packets to the target eNB 420.

Referring to FIG. 4B, the source eNB 410 transmits an SN status transfer message to the target eNB 420 at operation 7 and forwards data to the target eNB. The target eNB 420 may buffer the packets transmitted by the source eNB 410.

The UE 400 transmits a synchronization-related message to the target eNB 420 at operation 8, and the target eNB 420 transmits a UL allocation-related message to the UE 400 at operation 9.

The UE 400 transmits a handover confirm message to the target eNB 420 via an RRC connection reconfiguration complete message at operation 10 and may communicate packet data with the target eNB 420. The target eNB 420 may transmit the packet data to the S-GW 440.

At operation 11, the target eNB 420 transmits a path switch request message associated with E-RAB (1,2) to the MME 430 to request path switching.

In an embodiment of the disclosure, the operation establishing a VoLTE bearer during an X2 handover may vary according to whether the MME 430 receives the path switch request message before expiry of the timer.

According to an embodiment of the disclosure, if the MME 430 does not receive the path switch request message before expiry of the timer, it transmits, at operation ix, to the P-GW 450 a create bearer response message including EBI (3) and "No Resource Available" indicating that no resources are available. At operation x, the P-GW 450 transmits an RAA message including "Diameter_ Unable_to_comply" to the PCRF 460. The PCRF 460 transmits to the P-CSCF 470 an ASR message at operation xi to request session termination, and the P-CSCF 470 transmits to the PCRF 460 an ASA message at operation xii. The P-CSCF 470 transmits a STR message to the PCRF 460, at operation xiii, to request session termination, and the PCRF 460 transmits a STA message to the P-CSCF 470, at operation xiv, to terminate the session.

The MME 430 transmits to the P-GW 450 a modify bearer request message associated with E-RAB (1) at operation 12*a* to request modifying the corresponding bearer and a modify bearer request message associated with E-RAB (2) at operation 12*b* to request modifying the corresponding bearer.

At operation 13, the S-GW 440 may perform DL path switching.

Referring to FIG. 4C, the S-GW 440 may transmit an end marker to the source eNB, the source eNB 410 may transmit the end marker to the target eNB 420, and the target eNB 420 may communicate packet data with the S-GW 440.

The P-GW 450 transmits, at operation 14*a*, a modify bearer response message associated with E-RAB (1) to the MME via the S-GW 440 to modify the corresponding bearer in response to the modify bearer request message associated with E-RAB (1) and, at operation 14*b*, a modify bearer response message associated with E-RAB (2) to the MME 430 via the S-GW 440 to modify the corresponding bearer in response to the modify bearer request message associated with E-RAB (2). The MME 430 transmits a path switch request ACK message to the target eNB 420 at operation 15, and the target eNB 420 transmits a UE context release message to the source eNB 410 at operation 16. At operation 17, the source eNB 410 may release resources upon receipt of the UE context release message.

According to another embodiment of the disclosure, if the MME 430 receives the path switch request message before expiry of the timer, it may try the bearer setup procedure again at operation ix after the X2 handover is completed. The MME 430 transmits an E-RAB setup request message associated with the E-RAB (3) to the target eNB 420. The target eNB 420 transmits an RRC connection reconfiguration message to the UE 400 at operation x, and the UE 400 transmits an RRC connection reconfiguration complete message to the target eNB 420 at operation xi in response to the RRC connection reconfiguration message. The target eNB 420 transmits an E-RAB setup response message associated with the E-RAB (3) to the MME 430 at operation xii, and the MME 430 transmits a create bearer response message associated with the EBI (3) to the P-GW 450 via the S-GW 440 at operation xiii. At operation xiv, the P-GW 450 transmits an RAA message to the PCRF 460 to complete the VoLTE call setup signaling.

FIGS. 5A to 5C are a signal flow diagram illustrating a method for modifying a VoLTE bearer during an X2 handover according to an embodiment of the disclosure.

FIGS. 5A to 5C shows a procedure for modifying a VoLTE bearer during an X2 handover according to various embodiments of the disclosure.

Referring to FIGS. 5A to 5, it may occur that VoLTE call setup signaling (operations i to xiv) is triggered during X2 handover signaling (operation 1~17).

Referring to FIG. 5A, a UE 500 may receive a measurement control message from a source eNB 510 at operation 1 and transmit a measurement report to the source eNB 510 at operation 2, the measurement report being generated based on the measurement control message. The source eNB 510 may make a handover decision at operation 3 for the UE 500 based on the measurement report and transmit a handover request message including an E-RAB ID (1,2) to a target eNB 520 at operation 4.

Meanwhile, a P-CSCF 570 transmits an AA request message corresponding to an incoming call to a PCRF 560 at operation i, and the PCRF 560 performs session binding at operation ii upon receipt of the AA request message. The PCRF 560 transmits an AA answer message to the P-CSCF 570 at operation iii and generates a PCC rule at operation iv. The PCRF 560 transmits a RAR message to a P-GW 550 at operation v, and the P-GW 550 transmits, at operation vi, a create/update bearer request message including an EBI (3) to an MME 530 via an S-GW 540.

The MME 530 transmits an E-RAB setup/modify request message including the EBI (3) to the source eNB 510 at operation vii, and the source eNB 510 transmits, at operation viii, to the MME 530 an E-RAB setup/modified response message including the EBI (3) and "X2 Handover Triggered" indicating that an X2 handover is triggered. In this case, the X2 handover may incur a bearer setup/modification failure.

If the MME 530 receives the E-RAB Setup Response message including "X2 Handover Triggered," it starts (or executes) a timer and waits until a path switch request message is received from the target eNB 520.

The target eNB 520 transmits, at operation 5, a handover request ACK message associated with E-RAB (1,2) to the source eNB 510 in response to the handover request message received at operation 4. At operation 6, the source eNB 510 transmits a handover command message to the UE 500 via an RRC connection reconfiguration message. Upon receipt of the handover command message, the UE 500 may detach from the old cell and acquire synchronization with a new cell. The source eNB 510 transmits buffered and in-transit packets to the target eNB 520.

Referring to FIG. 5B, the source eNB 510 transmits an SN status transfer message to the target eNB 520 at operation 7 and forwards data to the target eNB. The target eNB 520 may buffer the packets transmitted by the source eNB 510.

The UE 500 transmits a synchronization-related message to the target eNB 520 at operation 8, and the target eNB 520 transmits a UL allocation-related message to the UE 500 at operation 9.

The UE 500 transmits a Handover Confirm message to the target eNB 520 via an RRC connection reconfiguration complete message at operation 10 and may communicate packet data with the target eNB 520. The target eNB 520 may transmit the packet data to the S-GW 540.

At operation 11, the target eNB 520 transmits a path switch request message associated with E-RAB (1,2) to the MME 530 to request path switching.

In an embodiment of the disclosure, the operation establishing a VoLTE bearer during an X2 handover may vary according to whether the MME 530 receives the path switch request message before expiry of the timer.

According to an embodiment of the disclosure, if the MME 530 does not receive the path switch request message before expiry of the timer, it transmits, at operation ix, to the P-GW 550 a create bearer response message including EBI (3) and "No Resource Available" indicating that no resources are available. At operation x, the P-GW 550 transmits a RAA message including "Diameter_Unable_to_comply" to the PCRF 560. The PCRF 560 transmits to the P-CSCF 570 an ASR message at operation xi to request session termination, and the P-CSCF 570 transmits to the PCRF 560 an ASA message at operation xii. The P-CSCF 570 transmits an STR message to the PCRF 560, at operation xiii, to request session termination, and the PCRF 560 transmits a STA message to the P-CSCF 570, at operation xiv, to terminate the session.

The MME 530 transmits to the P-GW 550 a modify bearer request message associated with E-RAB (1) at operation 12a to request modifying the corresponding bearer and a modify bearer request message associated with E-RAB (2) at operation 12b to request modifying the corresponding bearer.

At operation 13, the S-GW 540 may perform DL path switching.

Referring to FIG. 5C, the S-GW 540 may transmit an end marker to the source eNB, the source eNB 510 may transmit the end marker to the target eNB 520, and the target eNB 520 may communicate packet data with the S-GW 540.

The P-GW 550 transmits, at operation 14a, a modify bearer response message associated with E-RAB (1) to the MME via the S-GW 540 to modify the corresponding bearer in response to the modify bearer request message associated with E-RAB (1) and, at operation 14b, a modify bearer response message associated with E-RAB (2) to the MME 530 via the S-GW 540 to modify the corresponding bearer in response to the modify bearer request message associated with E-RAB (2). The MME 530 transmits a path switch request ACK message to the target eNB 520 at operation 15, and the target eNB 520 transmits a UE context release message to the source eNB 510 at operation 16. At operation 17, the source eNB 510 may release resources upon receipt of the UE context release message.

According to another embodiment of the disclosure, if the MME 530 receives the path switch request message before expiry of the timer, it may try the bearer setup procedure again at operation ix after the X2 handover is completed. The MME 530 transmits an E-RAB setup request message associated with the E-RAB (3) to the target eNB 520. The target eNB 520 transmits an RRC connection reconfiguration message to the UE 500 at operation x, and the UE 500 transmits an RRC connection reconfiguration complete message to the target eNB 520 at operation xi in response to the RRC connection reconfiguration message. The target eNB 520 transmits an E-RAB setup response message associated with the E-RAB (3) to the MME 530 at operation xii, and the MME 530 transmits an update bearer response message associated with the EBI (3) to the P-GW 550 via the S-GW 540 at operation xiii. At operation xiv, the P-GW 550 transmits an RAA message to the PCRF 560 to complete the VoLTE call setup signaling.

Figure 6:
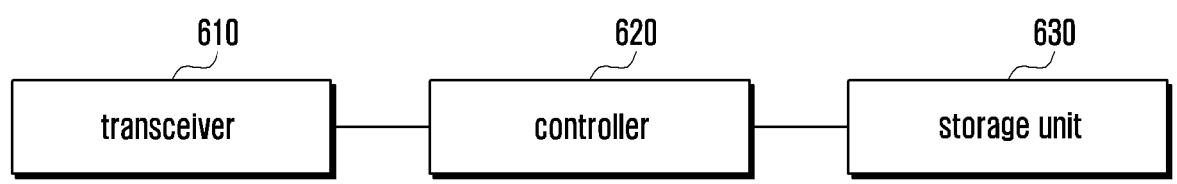
FIG. 6 is a diagram illustrating a configuration of an entity of a wireless communication system according to an embodiment of the disclosure.

FIG. 6 is a diagram illustrating a configuration of an entity of a wireless communication system according to an embodiment of the disclosure.

Referring to FIG. 6, the wireless communication system entity may include a transceiver 610, a controller 620, and a storage unit 630. In the disclosure, the controller may be defined as a circuit, an application-specific integrated circuit, or at least one processor.

The wireless communication system entity may be any of the source eNB (source base station), the target eNB (target base station), the mobility management entity (MME), the S-GW, the packet data network gateway (P-GW), the policy and charging rules function (PCRF), and the proxy call state control function (P-CSCF) that are described with reference to FIGS. 1, 2A, 2B, 3, 4A to 4C, and 5A to 5C.

The transceiver 610 may communicate signals with other network entities. If the entity depicted in FIG. 6 is a base station by way of example, the transceiver 610 may transmit system information, a synchronization signal, or a reference signal to a terminal.

According to an embodiment of the disclosure, the controller 620 may control overall operations of the wireless communication system entity. For example, the controller 620 may control signal flows among the function blocks to execute the operations described with reference to FIGS. 1, 2A, 2B, 3, 4A to 4C, and 5A to 5C.

The storage unit 630 may store at least one of information being transmitted/received by the transceiver 610 and information generated by the controller 620.

Figure 7:
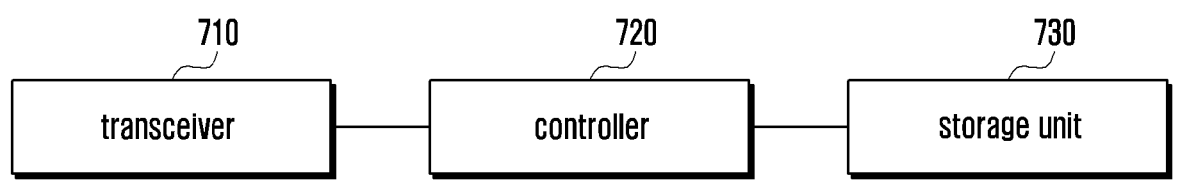
FIG. 7 is a diagram illustrating a configuration of a terminal according to an embodiment of the disclosure.

FIG. 7 is a diagram illustrating a configuration of a terminal according to an embodiment of the disclosure.

Referring to FIG. 7, the terminal may include a transceiver 710, a controller 720, and a storage unit 730. The embodiments of the disclosure are applicable to both the terminal that places a call and the terminal that receives a call. In the embodiment of the disclosure, the controller may be defined as a circuit, an application-specific integrated circuit, or at least one processor.

The transceiver 710 may communicate signals with network entities. The transceiver 710 may receive system information, a synchronization signal, or a reference signal from a base station.

According to an embodiment of the disclosure, the controller 720 may control overall operations of the terminal. For example, the controller 720 may control signal flows among the function blocks to execute the operations described with reference to FIGS. 1, 2A, 2B, 3, 4A to 4C, and 5A to 5C.

The storage unit 730 may store at least one of information being transmitted/received by the transceiver 710 and information generated by the controller 720.

As described above, the method and device according to an embodiment of the disclosure is advantageous in terms of making it possible to establish or modify a VoLTE bearer successfully even if an X2 handover is triggered before completion of bearer management.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a mobility management entity (MME) in a wireless communication system, the method comprising:
   transmitting, to a first base station, a first request message for radio access bearer (RAB) management;
   in response to a transmission of the first request message, receiving, from the first base station, a first response message for the RAB management, the first response message including information indicating whether an X2 handover is triggered;
   in case that the information indicates that the X2 handover is triggered, starting a timer associated with the RAB management; and
   performing, based on whether a second request message for path switching is received from a second base station before the timer expires, a procedure for the RAB management with the second base station.

2. The method of claim 1, wherein the RAB management includes at least one of establishment of a RAB or modification of the RAB.

3. The method of claim 1, wherein performing the procedure for the RAB management comprises:
   in case that the second request message is received from the second base station before the timer expires, transmitting, to the second base station, a message for requesting the RAB management.

4. The method of claim 3, further comprising:
transmitting, to a serving gateway (S-GW), a response message indicating a success of the RAB management.

5. The method of claim 1, wherein performing the procedure comprises:
in case that the second request message is not received from the second base station until the timer has expired, transmitting, to a serving gateway (S-GW), a response message indicating a failure of the RAB management, the response message including information indicating that resources associated with the RAB management are not available.

6. The method of claim 1, further comprising:
receiving, from a serving gateway (S-GW), a request message for the RAB management.

7. The method of claim 1, further comprising:
in case that the information does not indicate that the X2 handover is triggered, transmitting, to a serving gateway (S-GW), a response message indicating a failure of the RAB management, the response message including information indicating that resources associated with the RAB management are not available.

8. A mobility management entity (MME) in a wireless communication system, the MME comprising:
a transceiver; and
a controller coupled with the transceiver and configured to:
control the transceiver to transmit, to a first base station, a first request message for radio access bearer (RAB) management,
in response to a transmission of the first request message, control the transceiver to receive, from the first base station, a first response message for the RAB management, the first response message including information indicating whether an X2 handover is triggered,
in case that the information indicates that the X2 handover is triggered, start a timer associated with the RAB management, and
perform, based on whether a second request message for path switching is received from a second base station before the timer expires, a procedure for the RAB management with the second base station.

9. The MME of claim 8, wherein the RAB management includes at least one of establishment of a RAB or modification of the RAB.

10. The MME of claim 8, wherein the controller is further configured to:
in case that the second request message is received from the second base station before the timer expires, control the transceiver to transmit, to the second base station, a message for requesting the RAB management.

11. The MME of claim 10, wherein the controller is further configured to:
control the transceiver to transmit, to a serving gateway (S-GW), a response message indicating a success of the RAB management.

12. The MME of claimer 8, wherein the controller is further configured to:
in case that the second request message is not received from the second base station until the timer has expired, control the transceiver to transmit, to a serving gateway (S-GW), a response message indicating a failure of the RAB management, the response message including information indicating that resources associated with the RAB management are not available.

13. The MME of claim 8, wherein the controller is further configured to:
control the transceiver to receive, from a serving gateway (S-GW), a request message for the RAB management.

14. The MME of claim 8, wherein the controller is further configured to:
in case that the information does not indicate that the X2 handover is triggered, control the transceiver to transmit, to a serving gateway (S-GW), a response message indicating a failure of the RAB management, the response message including information indicating that resources associated with the RAB management are not available.

* * * * *